G. C. DEGNER.
PAN AND PLATE LIFTER.
APPLICATION FILED APR. 4, 1908.
949,650.
Patented Feb. 15, 1910.
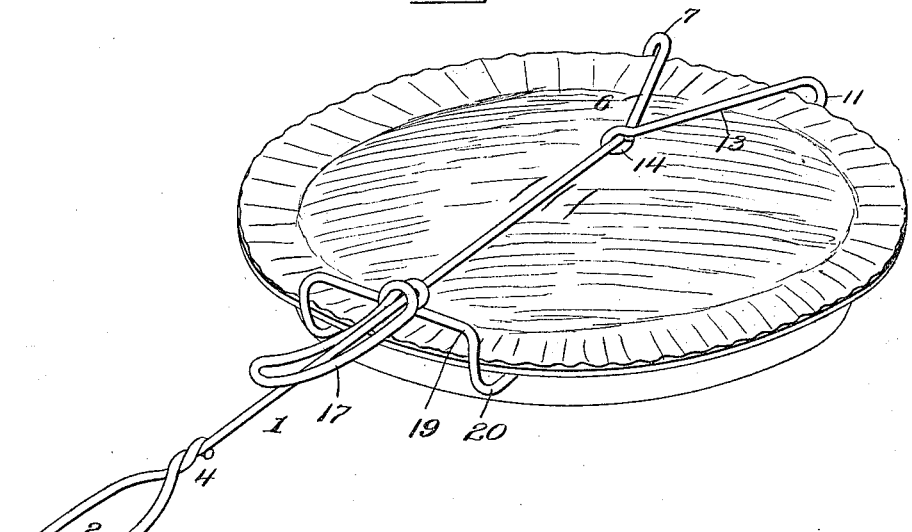
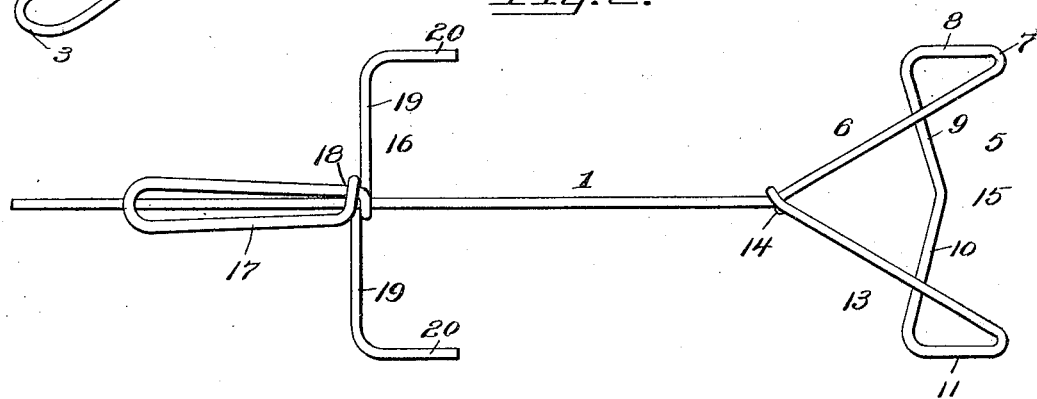
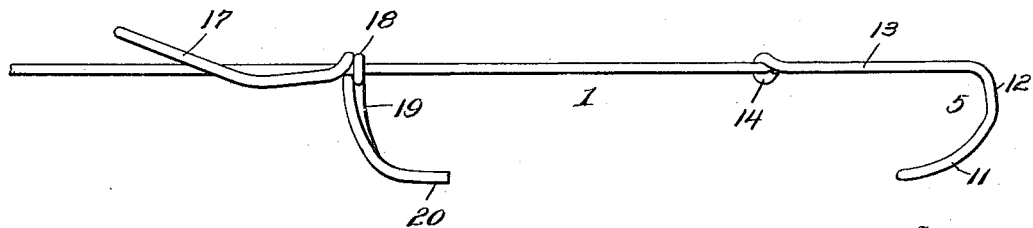
Witnesses
F. C. Gibson
J. W. Garner
Inventor
George C. Degner.
By Victor J. Evans
Attorney

UNITED STATES PATENT OFFICE.

GEORGE C. DEGNER, OF CHICAGO, ILLINOIS.

PAN AND PLATE LIFTER.

949,650.     Specification of Letters Patent.     Patented Feb. 15, 1910.

Application filed April 4, 1908. Serial No. 425,242.

*To all whom it may concern:*

Be it known that I, GEORGE C. DEGNER, a citizen of the United States, residing at Chicago, in the county of Cook and State of Illinois, have invented new and useful Improvements in Pan and Plate Lifters, of which the following is a specification.

This invention is an improved pan and plate lifter especially adapted for use in lifting and handling pans and metallic plates used for baking pies and other articles and the said invention consists in the construction, combination and arrangement of devices hereinafter described and claimed.

The object of my invention is to provide a simple device of this character which may be cheaply manufactured from wire and which will greatly facilitate the handling of heated pans, plates and the like culinary vessels.

In the accompanying drawings, Figure 1 is a perspective view of a lifter constructed in accordance with my invention, showing the same applied to a pie plate as for lifting the same. Fig. 2 is a plan of my improved lifter. Fig. 3 is a side elevation of the same.

In the construction of my improved pan or plate lifter, I provide a rod 1 of suitable length, and which is of wire of suitable gage and at one end of the said rod I form a handle 2 by doubling the wire to form a bend 3 and by coiling said end of the wire around the rod 1 at 4. At the opposite end of the said rod, I form a jaw 5 for engaging one side of the pan or plate. In the formation of this jaw, the wire rod is bent outwardly obliquely as at 6, is then turned downwardly at 7 a suitable distance, bent and curved forwardly and downwardly as at 8, is then bent to extend transversely and rearwardly as at 9, then transversely and forwardly as at 10, then curved and extended rearwardly and upwardly as at 11, then bent upwardly as at 12 and finally the terminal portion of the wire rod is turned obliquely and extended forwardly to converge toward the portion 6 as at 13 and is united to the wire rod by a bend 14. On the said rod 1 between the fixed jaw 15, formed as before described, and the handle 2 and adapted to slide on said rod is a movable jaw 16 which is made from a single piece of wire bent to form a forwardly extending handle portion 17 which is doubled as in the form of a loop, coils 18 which embrace and are slidable on the rod 1, transversely extending arms 19 and hooks 20 at the outer ends of said arms, which hooks extend downwardly and rearwardly and are adapted to engage the ledge of flange at the upper portion of the pan or plate at the side opposite that which is engaged by the jaw 15. The handle 17 of the sliding jaw may be readily grasped at the same time that the handle 2 is grasped and by the same hand, so that when the sliding jaw has been engaged with a pan or plate as well as the fixed jaw, the sliding jaw is prevented from becoming casually disengaged from and causing the dropping of the pan or plate. It will also be understood that the said sliding jaw may be readily moved into and out of engagement with the pan or plate.

I do not desire to limit myself to the precise construction and arrangement of devices herein shown and described, as it is evident that modifications may be made therein within the scope of the appended claim.

Having described my invention, what I claim as new and desire to cover by Letters Patent is:—

A pan lifter comprising a rod having an elongated loop-shaped handle at one end and a fixed jaw at the opposite end, both formed by having end portions of the rod bent upon itself and the extremities of the bent portions secured by being bent about the rod, the fixed jaw comprising outwardly diverged members, inwardly extending hooks and a transverse connecting rod outwardly deflected midway of its ends, and a sliding jaw mounted upon the rod formed of a single wire comprising a loop-shaped handle having its members embracing opposite sides of said rod, laterally extending arms, hooks at the ends of said arms to coöperate with the hooks of the fixed jaw and coils at the juncture of the handle members and arms for receiving the said rod.

In testimony whereof I affix my signature in presence of two witnesses.

GEORGE C. DEGNER.

Witnesses:
   MICHAEL F. CURE,
   WILL L. DYE.